United States Patent

[11] 3,582,814

[72] Inventors Michel A. Duguay
Berkeley Heights;
Peter M. Rentzepis, Millington, both of, N.J.
[21] Appl. No. 692,573
[22] Filed Dec. 21, 1967
[45] Patented June 1, 1971
[73] Assignee Bell Telephone Laboratories, Incorporated, Murray Hills, N.J.

[54] TWO-PHOTON LIQUID LASER
4 Claims, 4 Drawing Figs.

[52] U.S. Cl. .................................................. 331/94.5
[51] Int. Cl. .................................................. H01s 3/00
[50] Field of Search .................................... 331/94.5

[56] References Cited
UNITED STATES PATENTS
3,417,346  12/1968  Yatsiv ........................ 331/94.5
3,453,429  7/1969  Duguay et al. .............. 331/94.5X OTHER REFERENCES
"Russians On The Beam" from Electronics May 2, 1966, Vol. 39, No. 9
"Coherent Optical Mixing In Optically Active Liquids" by P. M. Rentzepis et al. Physical Rev. Ltrs, Vol. 16. No. 18 May 2, 1966
"Absorption and Excimer Fluorescence Spectra of Sandwich Dimens of Sub. Authracenes" by Chandross et al. J. of Chem Pys Vol. 45 No. 10 Nov. 15, 1966.

Primary Examiner—Ronald L. Wibert
Assistant Examiner—Paul K. Godwin
Attorneys—R. J. Guenther and Torsiglieri ABSTRACT: Lasing at ultraviolet and other wavelengths is achieved in a two-photon laser employing organic liquid mediums such as benzene solutions of 9, 10-dibromoanthracene, 9-methylanthracene and 9, 10-dimethylanthracene.

PATENTED JUN 1 1971 3,582,814

INVENTORS M. A. DUGUAY
P. M. RENTZEPIS
BY
ATTORNEY

TWO-PHOTON LIQUID LASER

BACKGROUND OF THE INVENTION

This invention relates to optical masers and, more particularly, to optical masers employing liquid active media and two-photon pumping.

The recent development of coherent light amplifiers and oscillators, now generally referred to as "optical masers" or "lasers," has made feasible a host of new uses and applications of electromagnetic wave energy in the optical portion of the spectrum. Light waves produced by such devices can be very sharply focused to produce energy densities suitable for welding, cutting, drilling and similar purposes. Furthermore, the high degree of monochromaticity obtainable from an optical maser makes it a useful tool for spectroscopic investigations as well as for stimulating various types of chemical and physical reactions. Among the most promising applications of coherent light are those in the field of communications where the optical spectrum represents virtually unlimited bandwidth and information carrying capacity. In addition, the directionality of optical maser beams greatly mitigates many problems of interference and security of communications channels.

For communications as well as other purposes it is advantageous to have optical masers operable at many different wavelengths in the light spectrum, which is deemed to include infrared, visible and ultraviolet energy. As the wavelength emitted by any particular energy transition in a laser medium is tunable only over a small portion of the spectrum, it is important to provide a number of materials adapted for use as active laser media at various light frequencies. A great amount of research has recently been directed to the discovery of such materials and a number, particularly in the solid and gaseous states, have been found. However, few liquids suitable as active laser media have been discovered. Furthermore, especially for communications use, it is important that laser media be provided which are adapted to continuous wave operation. In general, such media are those characterized by three or more energy levels, at least two of which are optically connected. Low noise, a further communications requirement, is a feature which, due to complex structure and emission characteristics of solids, appears more readily achievable with liquid optical masers.

For communications and other applications in which an optical maser beam is to be directed over a long transmission path through the atmosphere, the optical absorption characteristics of oxygen, nitrogen, carbon dioxide, water vapor and other atmospheric components must be considered. In the near infrared portion of the spectrum, for example, where many recently developed optical masers operate, the atmosphere tends to be a very lossy transmission medium. There are, however, a number of "windows" or spectral regions where the infrared losses are relatively low. A similar phenomenon occurs at ultraviolet wavelengths, but few optical masers operate in that portion of the spectrum. It is highly desirable to have available optical masers that produce coherent radiation at wavelengths corresponding to such transparent atmospheric windows.

SUMMARY OF THE INVENTION

An object of this invention is to generate and amplify coherent wave energy in the optical portion of the electromagnetic spectrum.

Another object of this invention is to facilitate the generation and amplification of coherent light by means of optical masers employing liquid active media and two-photon pumping.

It is also an object of this invention to facilitate the generation and amplification of coherent electromagnetic radiation in the ultraviolet portion of the spectrum and especially in portions corresponding to atmospheric windows.

These and other objects of the invention are achieved in an illustrative embodiment thereof comprising means forming an enclosed space for containing a liquid optical maser medium, and means defining an ultraviolet beam path through the enclosed space. Means are also provided for two-photon pumping the liquid medium with a second optical maser.

It is a feature of this invention that it employs two-photon pumping, i.e., the liquid active medium requires the absorption from a single pump signal of two photons per quantum of stimulated radiative output to produce a population inversion. (Alternatively, one photon may be absorbed from each of two pump signals having different frequencies.) Inversion occurs between a vibrational level associated with a ground singlet state and a higher level singlet state. The absorption of a first photon at the pump frequency excites electrons to an intermediate virtual state, and the absorption of a second photon, also at the pump frequency, excites electrons from the virtual state to the higher level singlet state. Stimulated emission occurs between the higher level singlet state and the vibrational level of the ground singlet state at ultraviolet wavelengths.

BRIEF DESCRIPTION OF THE DRAWINGS

The above and other objects of the invention, together with its various features and advantages, can be easily understood from the following more detailed description taken in conjunction with the accompanying drawings, in which.

DETAILED DESCRIPTION

Figure 1:
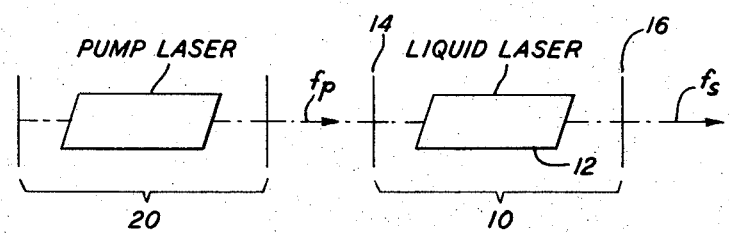
FIG. 1 is a schematic of an optical maser in accordance with one embodiment of the invention.

Turning now to FIG. 1, there is shown a liquid laser 10 aligned coaxially with a pump laser 20. The pump laser 20 generates a pump signal at frequency $f_p$ which induces an electron population inversion in the liquid active medium contained in appropriate means 12. The stimulated output of liquid laser 10 is designated as the signal $f_s$. Mirrors 14 and 16 are disposed coaxially on either side of the means 12 to form a cavity resonator, both mirrors 14 and 16 having a high reflectivity at $f_s$ but a low reflectivity at $f_p$. Other means to pump the liquid laser with a signal at frequency $f_p$ are, of course, readily adapted for use in the present invention by those skilled in the art.

The liquid active media employed in the present invention are generally two-photon organic liquids. That is, a typical medium requires the absorption from the pump signal of two photons, both having frequency $f_p$, per quantum of stimulated radiative output. As shown in the partial energy level system depicted in FIG. 2, one photon at $f_p$ excites electrons from an energy state $S_1$ to a higher virtual state $S_2$ and a second photon excites electrons from $S_2$ to a still higher state $S_3$. The state $S_3$ is typically broadband, e.g., several hundred angstrom units wide, because of the many vibrational levels associated with it. Thus, within a tolerance of several hundred angstrom units, the pump frequency is not critical. A population inversion is established between state $S_3$ and one of the vibrational levels $V_{S1}$ associated with the low energy state $S_1$, causing stimulated emission $f_s$ at ultraviolet wavelengths.

Figure 2:
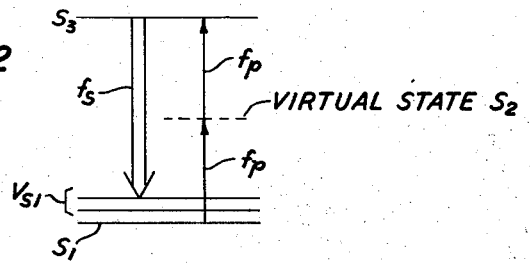
FIG. 2 is a diagram of a portion of the energy level system of an active laser medium used in accordance with one embodiment of the invention.

The state $S_2$ (FIG. 2, dotted line) is termed a virtual state to distinguish it from real states $S_1$ and $S_3$ (FIG. 2, solid lines). That is, as is well known in the art, a real state exists in fact and an electron, atom or molecule can actually occupy such a state. The virtual state $S_2$, however, does not exist in fact. It is only a convenient means of describing the phenomenon by which two photons excite a molecule between states $S_1$ and $S_3$.

Figure 3:
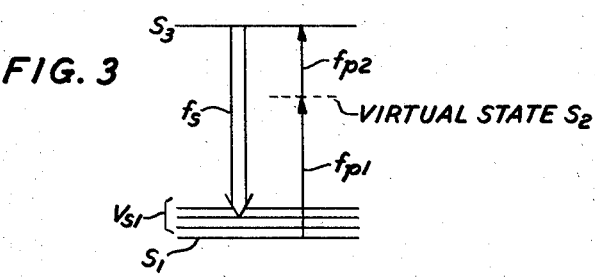
FIG. 3 is a diagram of a portion of the energy level system of active laser medium used in accordance with another embodiment of the invention.

By an analogous mechanism stimulated emission at ultraviolet wavelengths is produced by the absorption one photon from each of two pump signals having different frequencies $f_{p1}$ and $f_{p2}$ as shown in FIG. 3. To produce a population inversion of the pump frequencies should be such that the sum of their energies ($hf_{p1}+hf_{p2}$) is approximately equal to the energy separation between states $S_1$ and $S_3$. As with the previously described embodiment, the first photon is absorbed by a virtual state $S_2$, i.e., the first photon excites electrons from $S_1$ to $S_2$, where the second photon causes electrons to be excited from $S_2$ to $S_3$. A population inversion is thereby established between states $S_3$ and one of the vibrational states $V_{S1}$ associated with the low energy state $S_1$. Stimulated emission $f_s$ occurs again at ultraviolet wavelengths.

Figure 4:
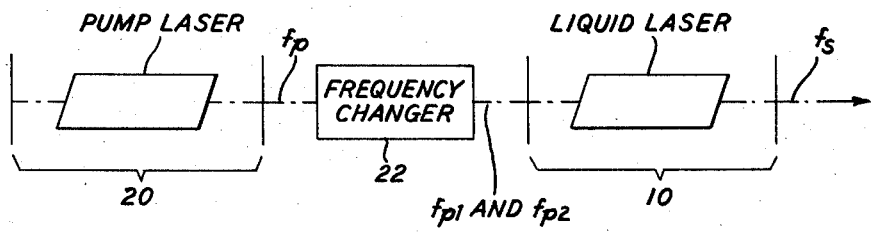
FIG. 4 is a schematic of an optical maser in accordance with another embodiment of the invention.

The two pump signals may be generated by two separate sources or, where the energy levels of the active medium are appropriate, the two pump signals may be derived from a single pump signal, as shown in FIG. 4 by well known frequency doubling techniques (e.g., by passing the pump signal through a KDP crystal, designated as frequency changer 22).

An optical maser in accordance with the invention has been operated in the pulsed mode with an active medium comprising a $10^{14}$ to $10^{11}$ molar solution of 9, 10-dibromoanthracene dissolved in benzene. The pump signal is supplied by a 6943A. ruby laser which produces a 15 nanosecond–20 megawatt peak power pulse, the threshold being at about 8—10 megawatts. Alternatively, two photon-two frequency pumping may be achieved by use of a 10,600A. neodynium laser to generate one pump signal, the second pump signal at 5,300A. being generated by passing the 10,600A. signal through neodynium laser to generate one pump signal, the second pump signal at 5,300A. being generated by passing the 10,600A. signal through a KDP crystal. The stimulated pulse output of the liquid laser occurs at wavelength of 3514A. and at a peak power of 30 kilowatts. It is feasible, however, to attain peak powers in the megawatt range.

Other liquid media include benzene solutions of 9-methylanthracene and 9, 10-dimethylanthracene which lase at about 3500A. and 3480A., respectively, when pumped with a 6943A. ruby laser. The medium 9, 10-dimethylanthracene, for example, has two electronic transitions in the range from 2000A. to 4000A. The low energy transition around 3550A. is of the type $^1A_{1g} \rightarrow {}^1B_{2u}$ with an extinction (absorption) coefficient of about $10^4$. The high energy transition around 2600A. is of the type $^1A_{1g} \rightarrow {}^1B_{3u}$ with an extinction coefficient of about $10^5$. Which of these transitions in fact occurs depends upon the power of the pump signal. Stimulated emission occurs between the vibrational level of the excited $^1B_{2u}$ state and the upper vibrational level ($\nu=2,ax=3$) of the ground state $^1A_{1gu}$. Liquids such as pyrene and fluorathene, on the other hand, lase at 3800A. and 3960A., respectively, when pumped with a 5300A. signal (e.g., the second harmonic of a 10,600A. neodynium laser).

The above examples were described with respect to pulsed lasers. However, inasmuch as the lifetime of the vibrational states $V_{S1}$ associated with state $S^1$ are in the picosecond range, it is readily possible to produce a continuous wave (CW) output by pumping the liquid medium with a CW pump signal.

The aforementioned wavelengths advantageously fall within the near ultraviolet atmospheric window which extends from visible blue wavelengths to about 3100A. at which point atmospheric constituents such as $O_3$ and $SO_2$ begin to absorb strongly. At even shorter wavelengths (i.e., less than 1900A.) other molecules such as $O_2$ absorb. For a detailed presentation of atmospheric absorption in the ultraviolet see Green, *The Middle Ultraviolet: Its Science and Technology*, John Wiley & Sons, Incorporated, 1966.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What we claim is:

1. An optical signal generator comprising
   means forming an optical capacity resonator,
   an active medium disposed along the axis of and within said resonator, said medium comprising a liquid characterized by a first energy level, a second energy level above said first energy level, at least one vibrational level associated with the first level, and further characterized by the absence of any real energy level intermediate said vibrational level and said second level, and
   means for producing stimulated emission of radiation in said medium by producing a population inversion between the second level and one of the vibrational levels of the first level said producing means causing said medium to absorb two photons per quantum of stimulated radiation, said photons causing electrons to be excited directly from the first level to the second level without causing said electrons to occupy any real state intermediate the vibrational and second energy levels.

2. The optical signal generator of claim 1 wherein said active medium comprises a material selected from the group consisting of 9, 10-dibromoanthracene, 9-methylanthracene, 9, 10-dimethylanthracene, pyrene and fluorathene.

3. The optical signal generator of claim 1 wherein said means for causing said medium to absorb two photons per quantum of stimulated radiation comprises means for directing into said medium a single signal having a frequency such that twice its energy corresponds approximately to the energy separation between said first and second levels.

4. The optical signal generator of claim 1 wherein said means for causing said medium to absorb two photons per quantum of stimulated radiation comprises means for directing into said medium two signals having frequencies such that the sum of their energies corresponds approximately to the energy separation between said first and second levels.

UNITED STATES PATENT OFFICE
CERTIFICATE OF CORRECTION

Patent No. 3,582,814      Dated June 1, 1971

Inventor(s) Michel A. Duguay and Peter M. Rentzepis

It is certified that error appears in the above-identified patent and that said Letters Patent are hereby corrected as shown below:

Column 3, line 20, change "$10^{14}$ to $10^{11}$" to --$10^{-4}$ to $10^{-1}$--.

Column 3, line 47, change "($\nu = 2$, $ax = 3$)" to --($\nu = 2$, $\nu = 3$)--.

Signed and sealed this 22nd day of February 1972.

(SEAL)
Attest:

EDWARD M. FLETCHER, JR.
Attesting Officer

ROBERT GOTTSCHALK
Commissioner of Patents